US 7,239,313 B2

(12) United States Patent
Liepa

(10) Patent No.: US 7,239,313 B2
(45) Date of Patent: Jul. 3, 2007

(54) SYSTEM AND METHOD FOR DIFFUSING CURVATURE

(75) Inventor: Peter Liepa, Toronto (CA)

(73) Assignee: Autodesk, Inc., San Rafael, CA (US)

( * ) Notice: Subject to any disclaimer, the term of this patent is extended or adjusted under 35 U.S.C. 154(b) by 195 days.

(21) Appl. No.: 10/835,285

(22) Filed: Apr. 30, 2004

(65) Prior Publication Data

US 2005/0243102 A1 Nov. 3, 2005

(51) Int. Cl.
*G06T 17/00* (2006.01)
(52) U.S. Cl. ........................... 345/420; 345/581
(58) Field of Classification Search .............. 345/420, 345/419, 428, 581, 582, 611, 615, 619, 643, 345/442
See application file for complete search history.

(56) References Cited

U.S. PATENT DOCUMENTS 6,693,631 B2 * 2/2004 Hubeli et al. ............... 345/420

OTHER PUBLICATIONS

Hubeli, "Fairing Of Non-Manifolds For Visualization", Oct. 2000, p. 407-414.*
Robert Schneider et al., "Geometric Fairing of Irregular Meshes using Mesh Hierarchies", Max-Planck Institute for Computer Science, Saarbrucken, Germany pp. 1-4.
Robert Schneider et al., "Geometric Fairing of Irregular Meshes for Free-Form Surface Design", Max-Planck Institute for Computer Sciences, Saarabrucken, Germany, May 2001.
Mathieu Desbrun et al., "Implicit Fairing of Irregular Meshes using Diffusion and Curvature Flow".
Andreas Hubeli et al., "Fairing of Non-Manifold Models", Computer Science Dept, ETH Zurich, CS Technical Report #337, Mar. 2000.
Leif Kobbelt et al., "Interactive Multi-Resolution Modeling on Arbitrary Meshes", University of Erlangen-Nurnberg.
Peter Liepa, "Filling Holes in Meshes", Eurographics Symposium on Geometry Processing, 2003.

* cited by examiner

*Primary Examiner*—Mark Zimmerman
*Assistant Examiner*—Kevin Xu
(74) *Attorney, Agent, or Firm*—Staas & Halsey LLP

(57) ABSTRACT

A system or method to distribute curvature in a set of target vertices by computing curvature at boundary vertices of the set of target vertices by use of an umbrella operator. The boundary curvatures may be distributed into the set of target vertices by solving for a system of Umbrella operator equations for curvatures of respective vertices of the set of target vertices, with the computed curvature at the boundary vertices as a boundary condition for the system of equations. The vertices of the set of target vertices may be repositioned relative to the their neighbors according to the solved curvatures of the respective vertices of the set of vertices. The computing, distributing, and repositioning may be repeated, thereby changing the overall shape of the set of target vertices according to the curvature at the boundary vertices.

1 Claim, 13 Drawing Sheets

130

132
$$\nabla \text{Area} = \frac{1}{2}\sum_i (\cot\alpha_i + \cot\beta_i)(V - V_i)$$

134
$$2kn = \lim_{\text{Area} \to 0} \frac{\nabla \text{Area}}{\text{Area}}$$

$k :=$ mean curvature

136
$$kn = \left[\frac{\sum \cot\alpha_i + \cot\beta_i}{4\text{Area}}\right] Umbrella(V)$$

SYSTEM AND METHOD FOR DIFFUSING CURVATURE

BACKGROUND OF THE INVENTION

1. Field of the Invention

The present invention is directed to a method and system for fairing meshes. More specifically, the present invention relates to diffusing curvature in meshes or clouds of vertices.

2. Description of the Related Art

In the field of computer graphics, surface fairing is performed to improve the shape of a mesh. Fairing has been described as the process of smoothing a mesh or surface, often by minimizing a fairness function. In some cases, meshes have holes or gaps, which may be the result of inadequate sampling, a user deleting part of a mesh, etc. Fairing is useful for constructing mesh patches that give a fair interpolation of the shape of the adjoining mesh. Further background information may be found in "Filling Holes in Meshes", Proceedings of the Eurographics/ACM SIGGRAPH symposium on Geometry processing, p. 200-205, June 2003", by Peter Liepa; "Geometric Fairing of Irregular Meshes for Free-Form Surface Design", Computer-Aided Geometric Design, 18(4):359-379, May 2001, by Schneider and Kobbelt; and "Implicit Fairing of Irregular Meshes Using Diffusion and Curvature Flow", SIGGRAPH 99 Conference Proceedings, pages 317-324, by Desbrun, Meyer, Schröder, and Barr.

There is a need for an efficient fairing process that produces reasonable diffusions or distributions of boundary curvature into a mesh that is being faired.

SUMMARY OF THE INVENTION

It is an aspect of the present invention to provide a system that efficiently and smoothly diffuses or distributes a curvature into a mesh.

It is another aspect of the present invention to provide a system that diffuses or distributes a boundary curvature into a mesh by solving a system of equations for curvature of vertices of the mesh.

It is yet another aspect of the present invention to provide a system that uses an Umbrella operator to compute a boundary curvature for fairing a mesh.

It is another aspect of the present invention to provide a system that distributes curvature into a mesh based on a recursive application of an Umbrella operator applied at least to an absolute value of the Umbrella operator and possibly also a scalar multiple thereof.

It is yet another aspect of the present invention to provide a system that uses a scale-dependent Umbrella operator to reduce global shape irregularity when smoothing a regular mesh.

It is a further aspect of the present invention to provide a system that computes boundary curvatures for diffusion or distribution into a mesh based on vertices in the mesh that are neighbors of the boundary vertices.

It is another aspect of the present invention to provide a system that uses an Umbrella operator to compute boundary curvatures and to compute vertex positions so that vertex curvatures simultaneously or mutually satisfy a neighborhood averaging condition.

The above aspects can be attained by a system or method that diffuses or redistributes curvature into a set of target vertices, by computing curvature at boundary vertices of the set of target vertices. The boundary curvatures may be diffused or distributed into the set of target vertices by solving a system of Umbrella operator equations for curvatures of respective vertices of the set of target vertices, with the computed curvature at the boundary vertices functioning as a boundary condition for the system of equations. The vertices of the set of target vertices may be repositioned according to the solved curvatures of the respective vertices of the set of vertices. The computing, diffusing or distributing, and repositioning may be repeated, thereby changing the overall or global shape of the set of target vertices according to the curvature at the boundary vertices. The target vertices preferably form a mesh, which may be a tessellation of a previously empty region of a mesh model.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 9 shows a target mesh after its vertices have been repositioned 86.

FIGS. 10 and 11 show results of incremental fairing.

DETAILED DESCRIPTION OF THE PREFERRED EMBODIMENTS

In the following description, the term "curvature" represents how much the local neighborhood surface deviates from a flat plane. An "area or region of interest", "target region", or "target vertices" thereof refers to vertices that move as a result of the fairing process. "Boundary vertex" is used to refer to a fixed or non-target vertex that has at least one adjacent or associated target vertex. Furthermore, a "boundary condition" is used below to refer to a value that is assigned or computed for a boundary vertex. Examples of boundary conditions are vertex positions, vertex normals, or vertex curvatures. A prescribed normal refers to the case where a boundary vertex normal is given.

Interpolation is one technique for fairing. Fairing by mesh interpolation relates to smoothly distributing values into a mesh based on values found at a boundary of the mesh. The boundary values can be distributed into the interior of the mesh by requiring the interior values to mutually satisfy local averaging conditions, some of which include the boundary values. This process leads to a smooth distribution of values, and mimics natural diffusions, for example membrane diffusion, heat diffusion, etc. Some of these types of diffusion problems are known as elliptic boundary condition problems, Dirichlet problems, or steady state diffusion processes. Again, with mesh interpolation, a value is distributed smoothly throughout a mesh by ensuring that a local averaging condition holds true after the value has been diffused into the mesh. Smoothness may be achieved by requiring the value at a vertex to be some average of the values of its neighboring vertices. Mesh fairing can be performed by smoothly interpolating boundary curvatures into the target mesh.

Figure 1:
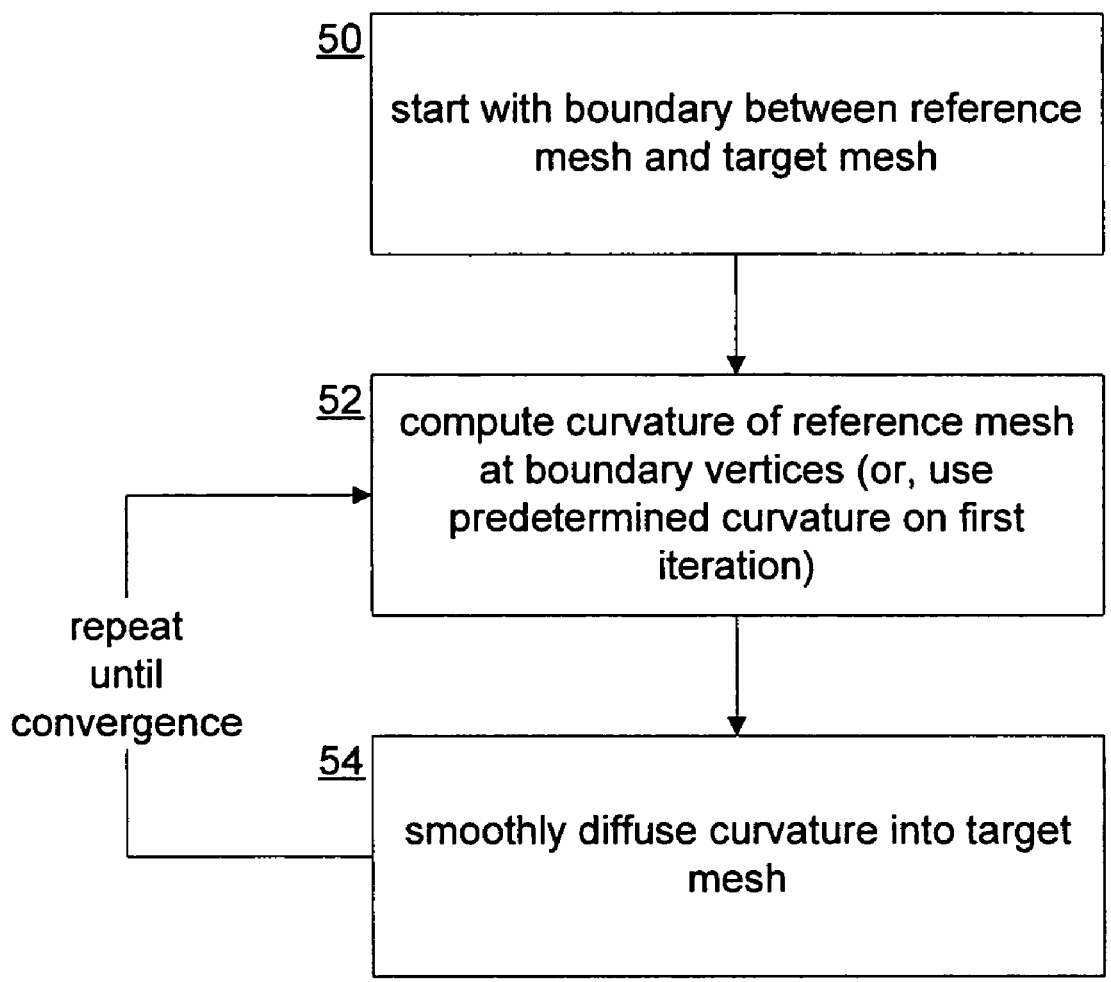
FIG. 1 shows a general fairing process.

FIG. 1 shows a general fairing process. The process starts 50 with a reference mesh and a target mesh sharing a boundary of common vertices. Curvature at boundary vertices is computed 52, or predetermined curvatures may be initially used. The boundary curvatures are smoothly diffused 54 into the target mesh. The computation 52 of boundary curvature and the subsequent diffusion 54 thereof may be repeated until a convergence condition is satisfied. Diffusion 54 of curvature into the target mesh may affect the subsequent computed 52 boundary curvatures, which may in turn affect subsequent diffusions 54.

Figure 2:
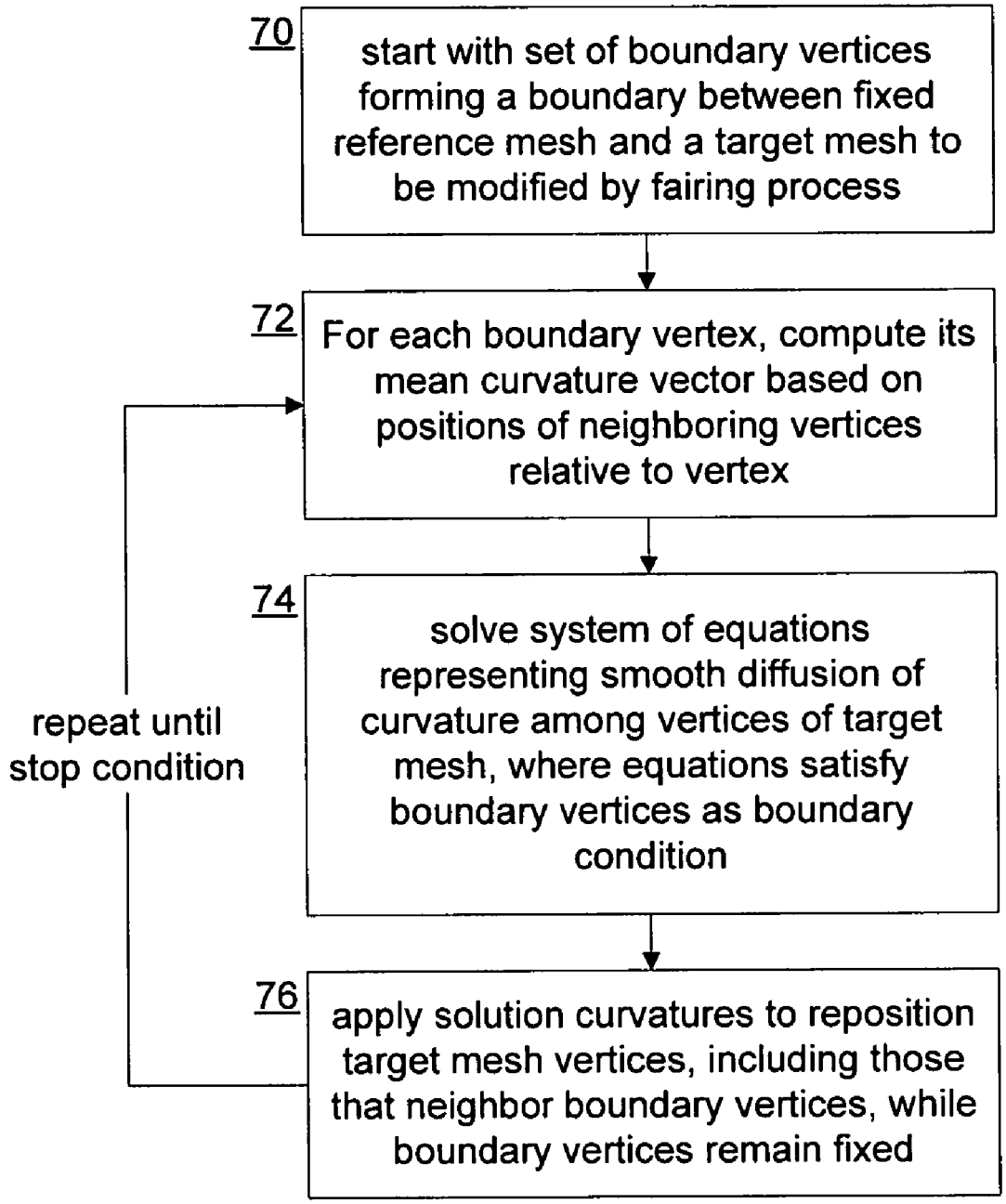
FIG. 2 shows another interpolation fairing process.

FIG. 2 shows another interpolation fairing process. A target mesh is faired by starting 70 with a set of boundary vertices that form a boundary between a fixed reference mesh and a target mesh that is to be modified by the fairing process. At the beginning of a fairing iteration, the curvature is determined, obtained, or computed 72 for each boundary vertex. The curvature is based on positions of neighboring vertices relative to the boundary vertex whose curvature is being computed 72. Given the computed 72 boundary curvatures, it is possible to solve 74 a system of equations that represent a smooth distribution or diffusion of target vertex curvatures satisfying the boundary conditions given by the boundary vertex curvatures. The solution curvatures are applied 76 to the vertices of the target mesh, thereby repositioning the target mesh vertices. Some of the repositioned target mesh vertices are neighbors of boundary vertices, and boundary vertices remain fixed. The process of computing 72 boundary curvature, solving 74 of the system of equations, and applying 76 the solution curvatures is repeated until a stop condition is satisfied. The stop condition can be a fixed loop limit, a convergence criterion such as a minimal change in the average curvature of the target mesh, or any other predetermined or dynamic condition.

Figure 3:
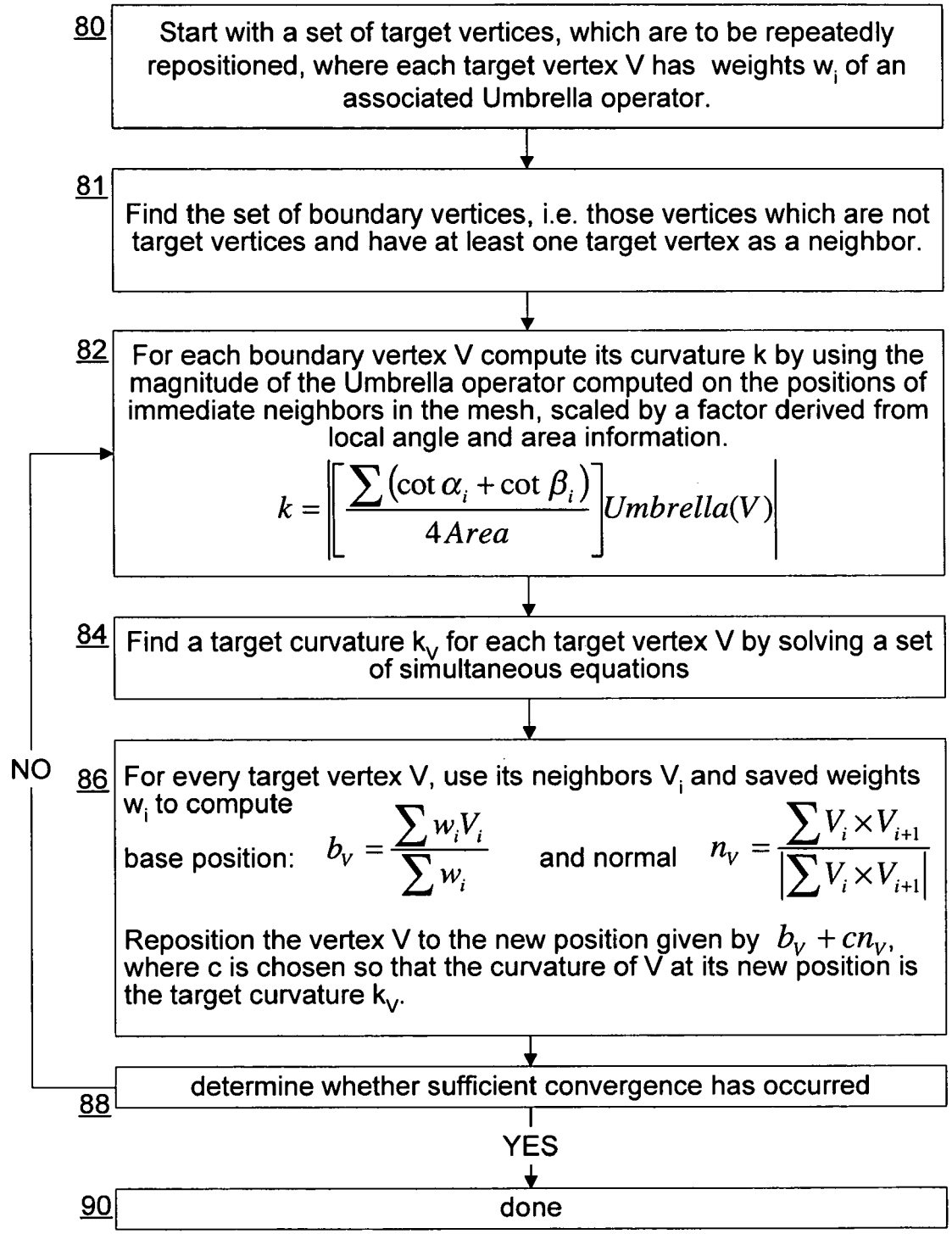
FIG. 3 shows a detailed process of using an Umbrella operator to fair a target mesh.

FIG. 3 shows a detailed process of using an Umbrella operator to fair a target mesh. The process starts 80 with a set of target vertices, which are to be repeatedly repositioned, where each target vertex V has weights $w_i$ of an associated Umbrella operator.

Figure 4:
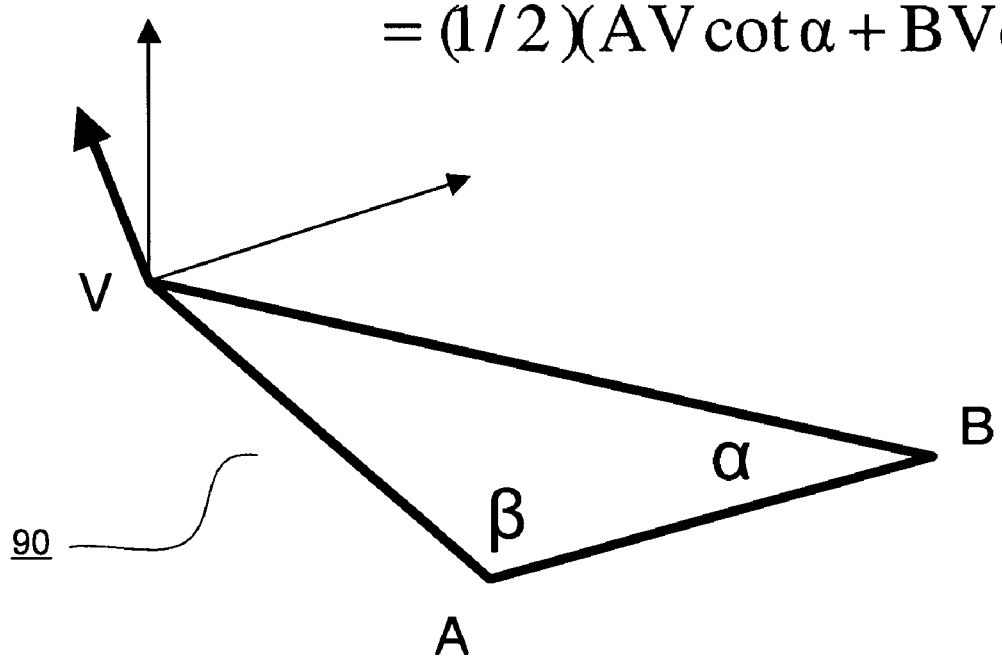
FIG. 4 shows a formula for gradient of area 92 of a triangle 90.
Figure 5:
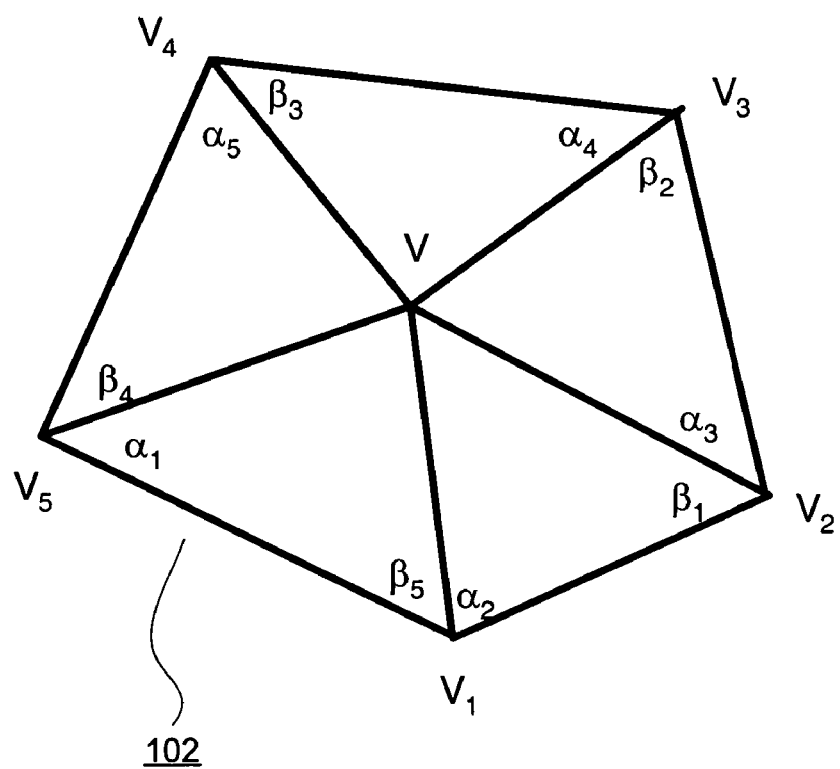
FIGS. 5 and 6 show vertices, angles, formulas, and vectors related to a neighborhood Umbrella operator.
Figure 6:
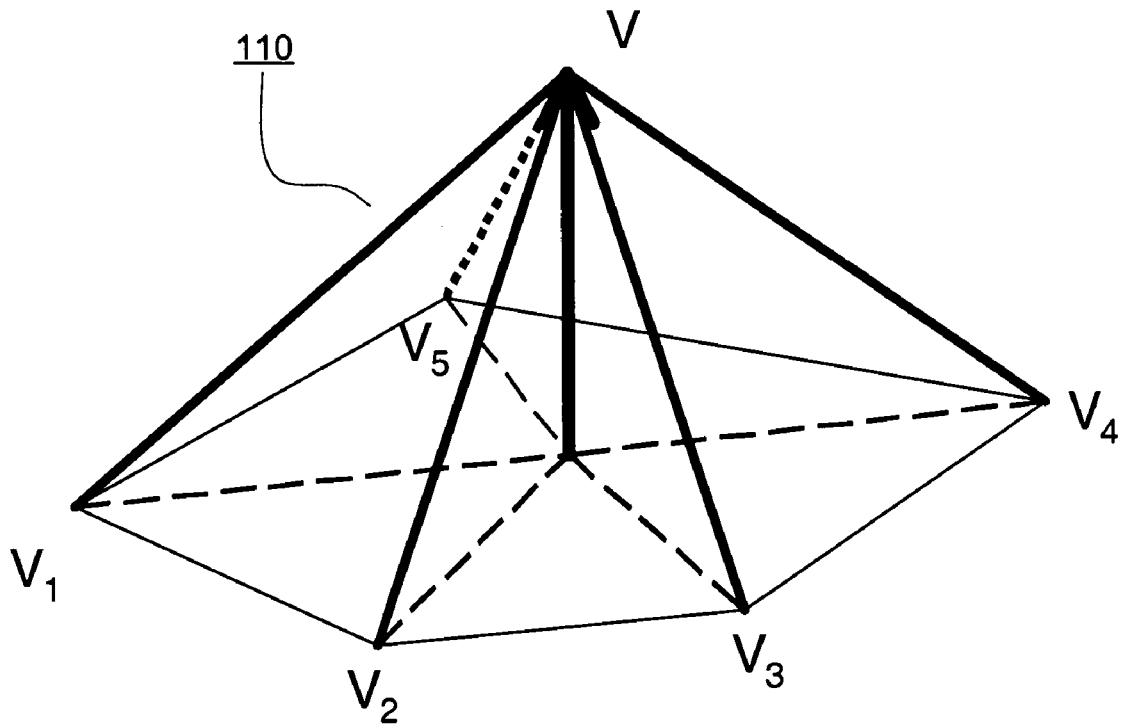

The Umbrella operator is discussed below with respect to FIGS. 4-6 before resuming discussion of FIG. 3. FIG. 4 shows a formula for gradient of area 92 of a triangle 90. FIG. 4 shows the intuitive triangle property that the gradient of a triangle with respect to V is perpendicular to the base and is one half the base rotated by 90 degrees. FIGS. 5 and 6 show vertices, angles, formulas, and vectors related to a neighborhood Umbrella operator. In FIG. 5, assuming vertex V at the center of geometry 102 is the vertex whose Umbrella is being computed 82, then formula 100 states that the sum of the weighted vectors between V and its neighbors (V1 . . . V5) is equal to the sum of the rotated outer bases of the triangles. FIG. 6 shows an Umbrella vector 110. In FIG. 6, assuming that vertex V is the vertex whose Umbrella is to be computed, the Umbrella vector 110 can be determined in accordance with formula 112, by dividing the weighted sum of the positions of neighboring vertices (V1 . . . V5) by the sum of the weights, and then subtracting the result from the position of V. Formula 112 gives the Umbrella vector of V, which is the difference between the position of V and the weighted average of its neighboring vertices' positions.

Given any scalars associated with each of the neighboring vertices, the value of the Umbrella operator on those scalar values in terms of the neighborhood geometry can be computed for V by subtracting the weighted average of neighboring scalar values from the scalar value at the vertex; that is, for each vertex with some value, take the difference between the value at the vertex and the weighted average of the value at neighboring vertices. Mathematically, a possible scale-dependent positional Umbrella operator is:

$$\text{Umbrella}(V) = V - \frac{\sum (\cot \alpha_i + \cot \beta_i) V_i}{\sum (\cot \alpha_i + \cot \beta_i)} \quad (1)$$

Returning to FIG. 3, a set of boundary vertices is found 81, where boundary vertices are those vertices that are not target vertices and have at least one target vertex as a neighbor. For each boundary vertex V curvature k is computed by using the magnitude of the Umbrella operator computed on the positions of immediate neighbors in the mesh, scaled by a factor derived from local angle and area information. A target curvature $k_{\widetilde{V}}$ is found 84 for each target vertex V by solving a set of simultaneous equations.

The position of each vertex relative to its neighbors is preferably recorded and used to retain the general shape of the target area while repositioning. After computing new curvature for an iteration, a vertex is recentered as a weighted average of its neighbors. A normal is calculated for that neighborhood using an area vector. An area vector or direction may be thought of as a vector of a polygon on the surface of a volume, where the vector is similar to a force vector of a gas emitting from the volume at an opening of the polygon. In other words, an area direction or vector typically defines a direction of an area roughly normal to the area (and if the area is planar the area vector is exactly perpendicular to the area). In sum, a weighted average of a target vertex's neighbors is taken, a normal roughly perpendicular to the area spanned by the neighbors is assigned, and the vertex is moved along that normal a distance proportional to the curvature that is required.

Figure 7:
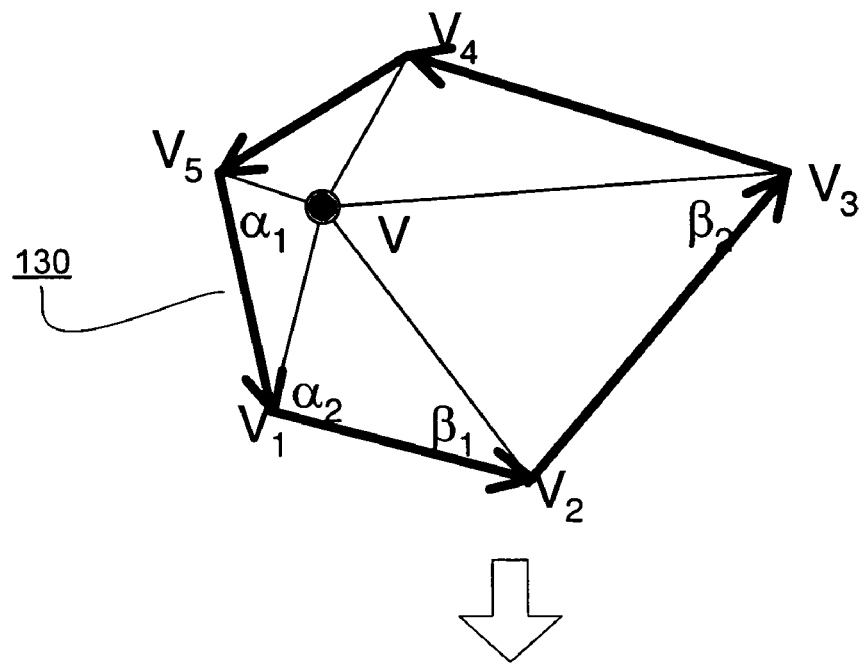
FIG. 7 shows how a gradient Umbrella operator can be derived.

FIG. 7 shows how the gradient Umbrella operator can be derived. It is possible to calculate the curvature given the neighborhood area and the gradient of the neighborhood area as seen in formula 134, which gives the mean curvature for smooth surfaces. The gradient for the neighborhood of V with respect to V is the sum of the rotated bases of the component triangles of the neighborhood, which is equivalent to a weighted sum of the spokes (vectors from neighbor vertices to V). The gradient of area for the neighborhood has a same direction as the Umbrella operator of formula (1) but it has a different magnitude. A neighborhood 130 has at V a discrete area gradient 132. For smooth surfaces, the ratio of area gradient to twice the area approaches mean curvature 134 as the area converges to 0. Curvature can be computed from neighbors using formula 136 (formula (2) below). When the Umbrella operator is computed in terms of gradient of area, it can be easily verified that the curvature k of a vertex V can be computed by one of the following formulas:

$$k = \left| \frac{\sum_i (\cot \alpha_i + \cot \beta_i)(V - V_i)}{4 \text{ Area}} \right| \quad (2)$$

$$k = \frac{n \cdot \sum_i (\cot \alpha_i + \cot \beta_i)(V - V_i)}{4 \text{ Area}} \quad (2a)$$

Either all neighboring vertices (target and reference vertices) may be plugged into formula (2), or only a partial neighborhood consisting of target and boundary vertices may be plugged into formula (2a), in which case, a normal n is prescribed for the vertex and "Area" is the area of the adjacent triangles that are in the target mesh. Note that for vertices $V_i$ in (2a) that are boundary vertices, there will be only one angle $\alpha_i$ or $\beta_i$ (but not both).

A system of mutually related equations Umbrella($k_V$)=0 for each target vertex V is solved.

Returning again to FIG. 3, for every target vertex V, its base position $b_V$ and normal $n_V$ are computed 86 using neighbor vertex positions. The vertex V is repositioned to the new position given by $b_V + c n_V$, where c is chosen so that the curvature of V at V's new position is the target curvature $k_V$. This approximates a scale-dependent fairing or distribution of curvature based on boundary curvatures (scale-dependent meaning dependent on local scale or scalar distances). The procedures from 82 to 86 may be repeated if it is determined 88 that a stop condition such as degree or sufficiency of convergence is not satisfied, until the overall fairing process is complete 90.

In sum, an Umbrella operator may provide: an averaging of functions (e.g. curvature or position) on vertices; a tessellation-independent measure of surface area gradient, which is also a surface normal; a measure of mean curvature as direction and/or magnitude; and/or it can be scale-dependent.

Figure 8:
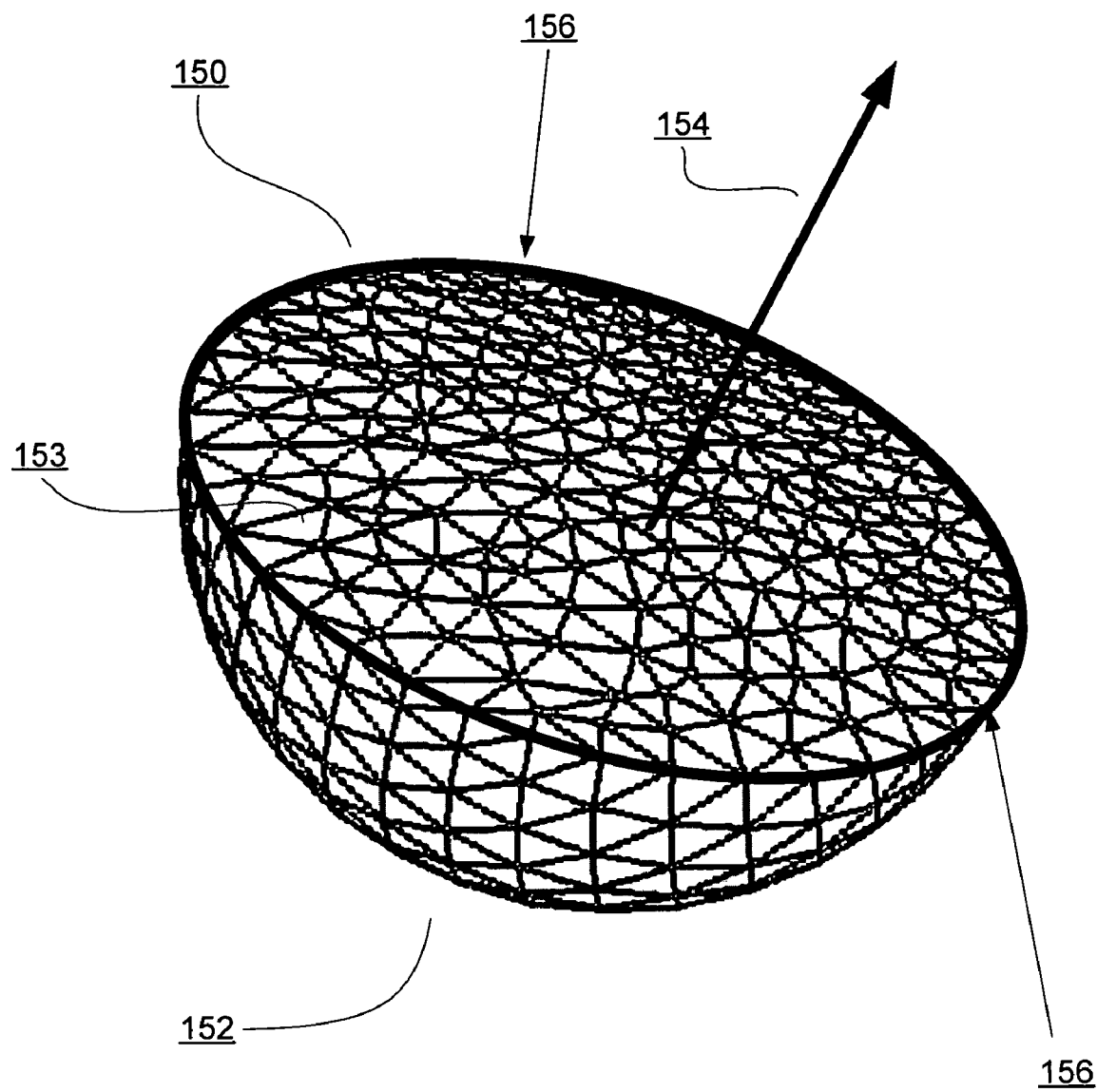
FIGS. 8-11 show incremental changes in a target mesh as it is faired.

FIGS. 8-11 show incremental changes in a target mesh as it is faired. FIG. 8 shows a hemisphere mesh object to be faired. A boundary 150 of vertices divides fixed reference mesh 152 and target mesh 153. Arrow 154 shows the direction that the target mesh 153 will move as it is faired. The fairing process starts 80 at the boundary 150. For each boundary vertex 156 in the boundary 150, a curvature is computed 82 using the Umbrella operator of formula (2) or (2a) computed on the position of the immediate neighbors of the vertex. The neighbors to be included in curvature computation 82 will determine what type of fairing will be performed. If neighbors from both the target mesh 153 and the reference mesh 152 are included in the neighborhood of computation 82, then the fairing process will result in a blend of the curvature of the reference mesh 152 and the target mesh 153. If neighbors from the target mesh 153 are included in the neighborhood, and neighbors of the reference mesh 152 are not included, then the fairing process will result in a faired target mesh 153 whose tangent plane does not match the tangent plane of the reference mesh 152. In this case, prescribed normals are used. In other words, if the curvature is based on a partial neighborhood then a prescribed normal is used. The initial boundary curvature may also be determined before the fairing process begins, for example it may be based on user input, the curvature of a previous mesh at the boundary that has been replaced by the target mesh 153, etc.

Given the initial computed 82 boundary curvatures $k_b$, diffused curvatures $k_t$ are found 84 for each vertex in the target mesh 153 by solving a simultaneous set of equations for each vertex, preferably using Umbrella(k)=0 as the equation. When the desired curvatures have been found 84, the vertices of the target mesh 153 are repositioned 86 by applying the curvatures found 82 for the respective target mesh 153 vertices.

Figure 9:
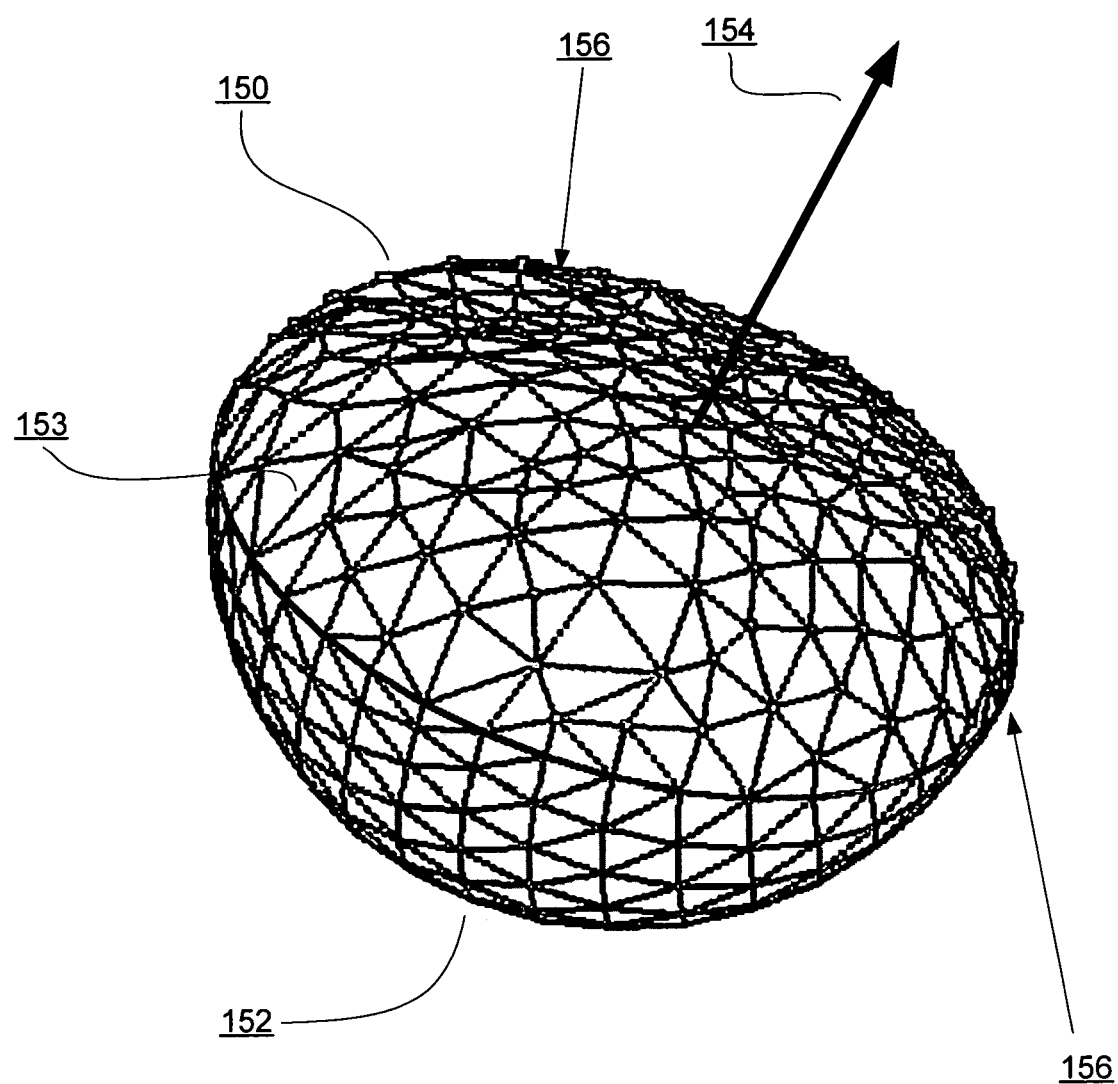
Figure 10:
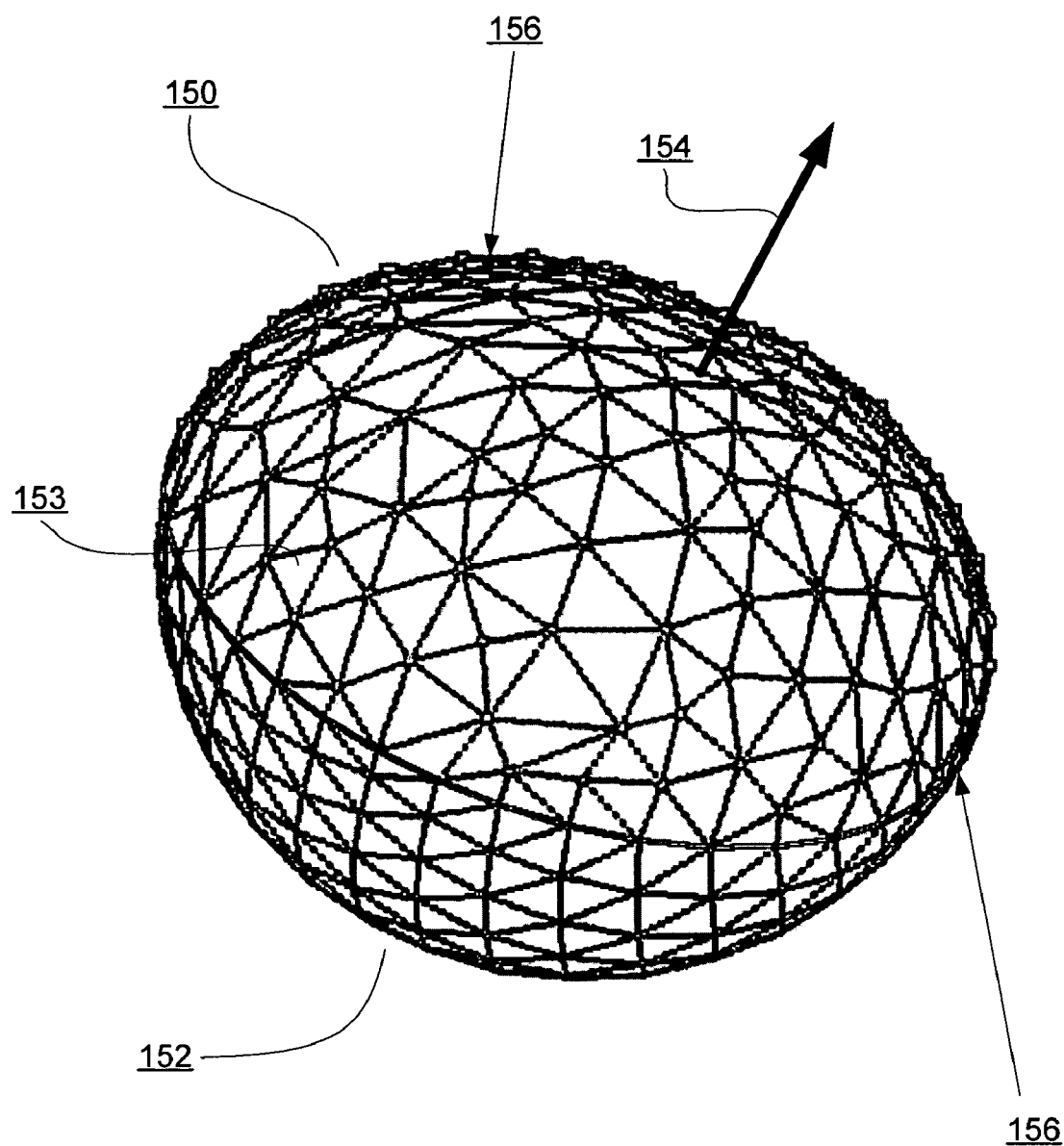
Figure 11:
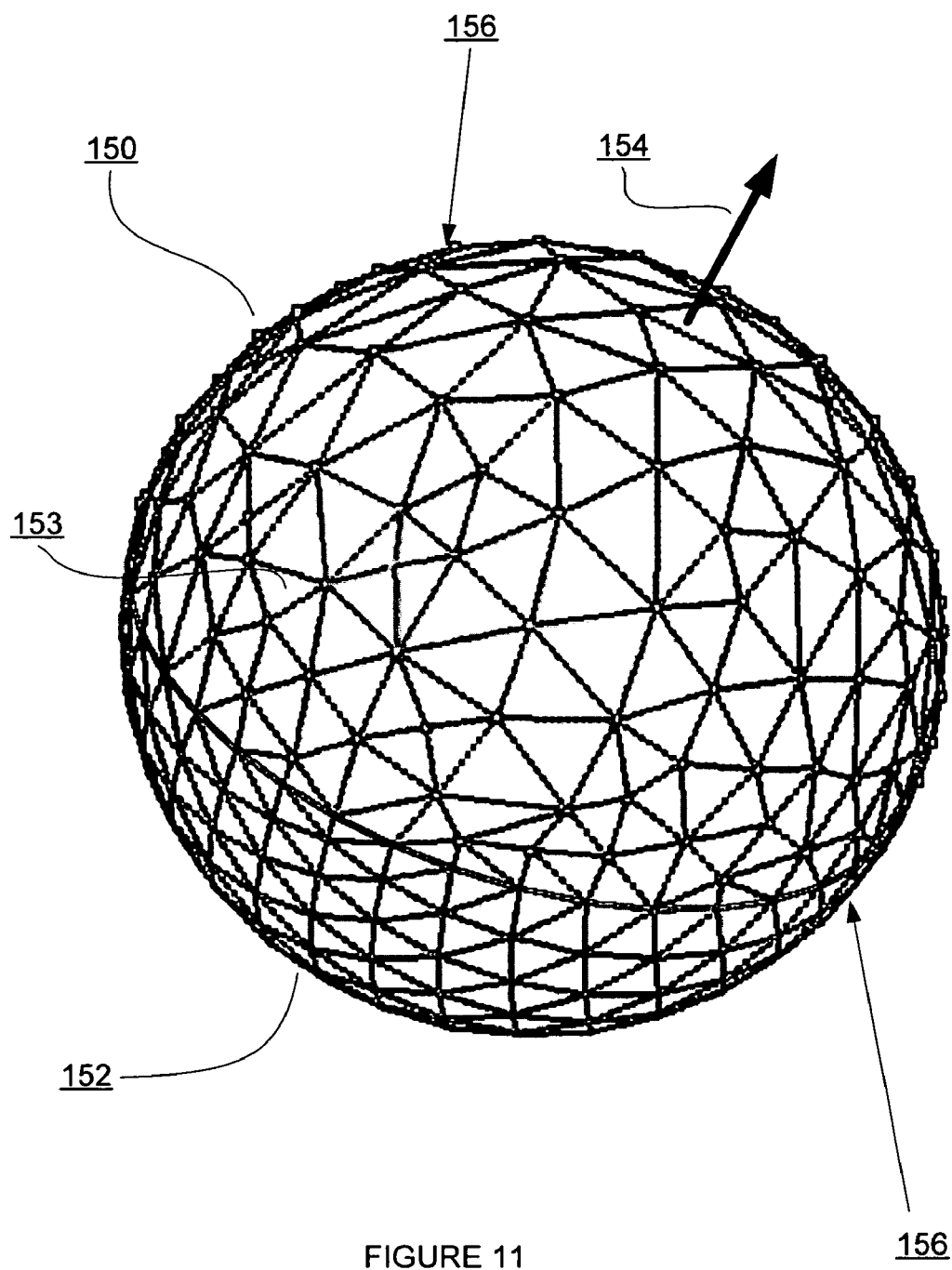

FIG. 9 shows the target mesh 153 after its vertices have been repositioned 86. FIGS. 10 and 11 show the results of additional fairing by repeated application of steps 82, 84, and 86.

Figure 12:
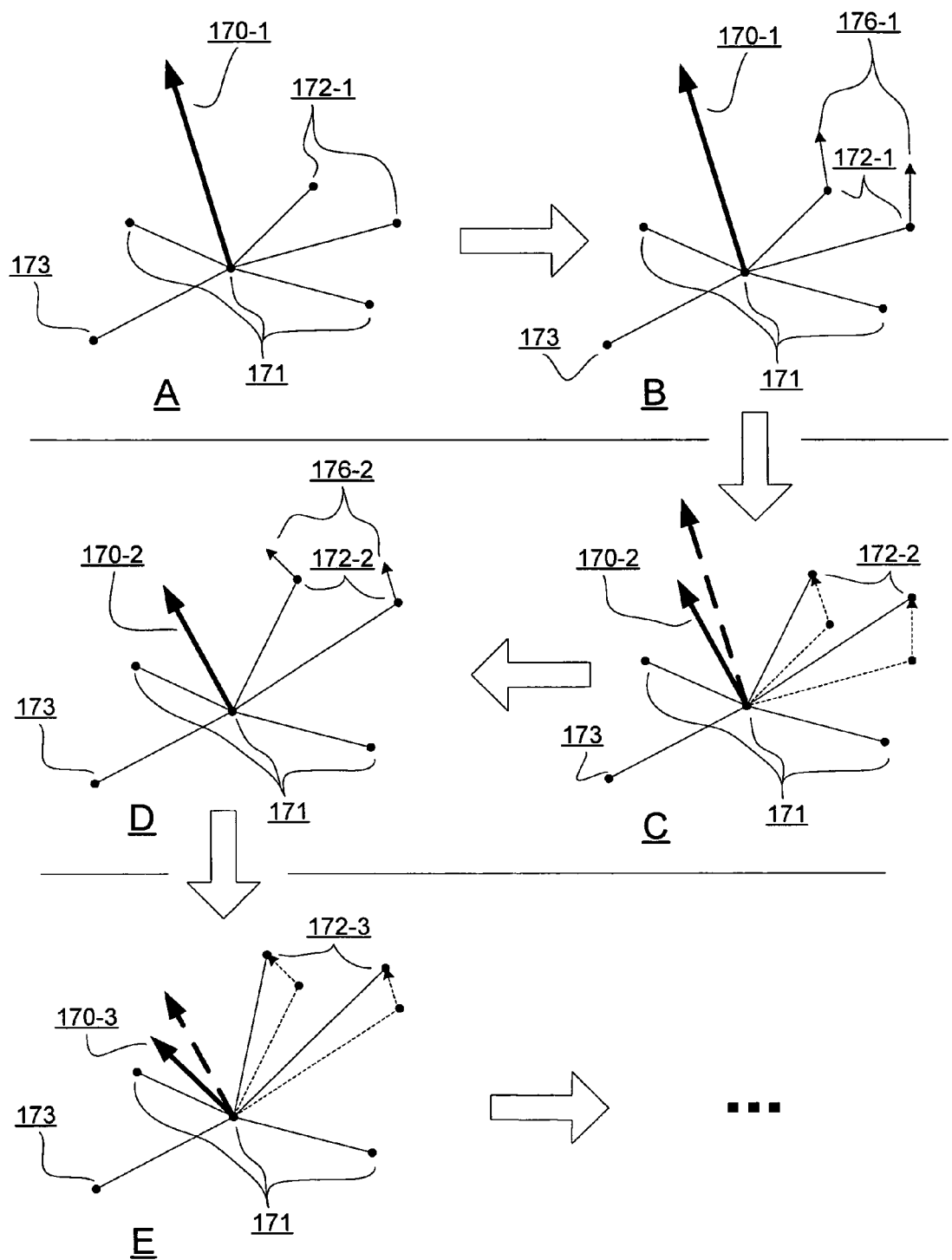
FIG. 12 shows a local view of repositioning vertices of target mesh 153.

FIG. 12 shows a local view of repositioning vertices of target mesh 153. At initial stage A, boundary curvature 170-1 of a boundary vertex 156/171 is computed 82 based on the Umbrella of the position of vertices 172-1 in neighboring target mesh 153, and optionally vertices 173 of reference mesh 152 (this discussion relates to computations for the middle of the three boundary vertices 171 in FIG. 12). Smoothly diffused mean curvatures 176-1 are found 84 (stage B), the vertices 172-1 of the target mesh 153 are moved to new positions 172-2 according to the diffused curvatures 176-1, and after determining 88 that fairing should continue, a new boundary curvature 170-2 is computed 82 based on the repositioned vertices 172-2 of the target mesh 153 (stage C). Diffused curvatures 176-2 are found 84 according to the position of vertices 172-2 and the new boundary curvature 170-2 (stage D). The target vertices are again repositioned 86 to 172-3, a new boundary curvature 170-3 is found 82 (stage E) and so on until it is determined 88 that the fairing process should stop.

Although the fairing techniques discussed above may be applied to mesh surfaces with boundaries, the techniques can also be applied without requiring a formal boundary or edge connected vertices. For example, if given a cube tessellated with 100 quadrilaterals per face, each split into two triangles, a curvature diffusion on all of the vertices can be computed. In this example the end fairing result would be a sphere.

In general, if there is a mesh with N vertices, and it is divided into F fixed and N-F non-fixed points, then F can be any number inclusive between 0 and N. A curvature diffusion can be run on the non-fixed points as long as each non-fixed point has a complete vertex neighborhood. That is to say curvature diffusion can be applied to a setting other than a hole or patch. A single vertex or a set of connected vertices (acyclic) can be diffused into a surrounding mesh. The vertices to be diffused into can be determined by a cutoff test, such as a distance, a minimum or maximum value of an associated scalar, etc. At a more basic level, given a single vertex with a local neighborhood and the Umbrella-computed mean curvature, a curvature diffusion can comprise solving for that mean curvature and the mean curvature for another vertex. Closed or interconnected boundaries are not required.

Furthermore, fairing processes discussed above can be applied to clouds of points or vertices rather than explicitly interconnected vertex meshes. Neighborhoods can be determined based on a substitute for edge-connectedness, for example a neighborhood can be based on proximity or some other metric that relates vertices. Finally, any of the processes discussed above may be applied in arbitrary dimensions and polygons other than triangles may be used.

The scale-dependent Umbrella operator discussed above may be generalized beyond a cotangent-weighted operator on meshes. For example, inverse-distance weights for points in clouds may be used. In this approach, the umbrella operator may be used to compute the discrepancy between a point and its neighbors. This discrepancy may be converted to a scalar by taking the magnitude of the discrepancy and then optionally multiplying this scalar by other scalars derived from neighborhood geometry, such as angles and areas. This alternative discrepancy measure may be plugged into the scheme discussed above; apply the umbrella operator, get a magnitude, and optionally scale it. One kind of scaling gives a curvature for a mesh, which provides angles and areas. But it is not necessary to perform scaling, in which case a discrepancy is obtained that can also be used to solve a system of averaging equations.

The fairing process can be applied to mesh models that have holes or gaps. Often mesh models are generated by sampling a real world object. However, sampled mesh models often have holes caused by occlusion and other sampling deficiencies. Also, sometimes a person working with a mesh model will desire to remove an undesired portion of the mesh model, leaving a hole gap, notch, etc. in the mesh model. In both cases, the problem is how to smoothly reconstruct the missing portion of the mesh model, preferably blending with the mesh model. Aspects described above can be used to create fair meshes that patch missing portions of mesh models. The diffused curvature of such patches can be influenced or bounded by either a curvature of a tessellation of the missing region (the region to be patched), for example the flat mesh 153 in FIG. 8, the deleted vertices, the neighboring mesh model, or combinations thereof.

Figure 13:
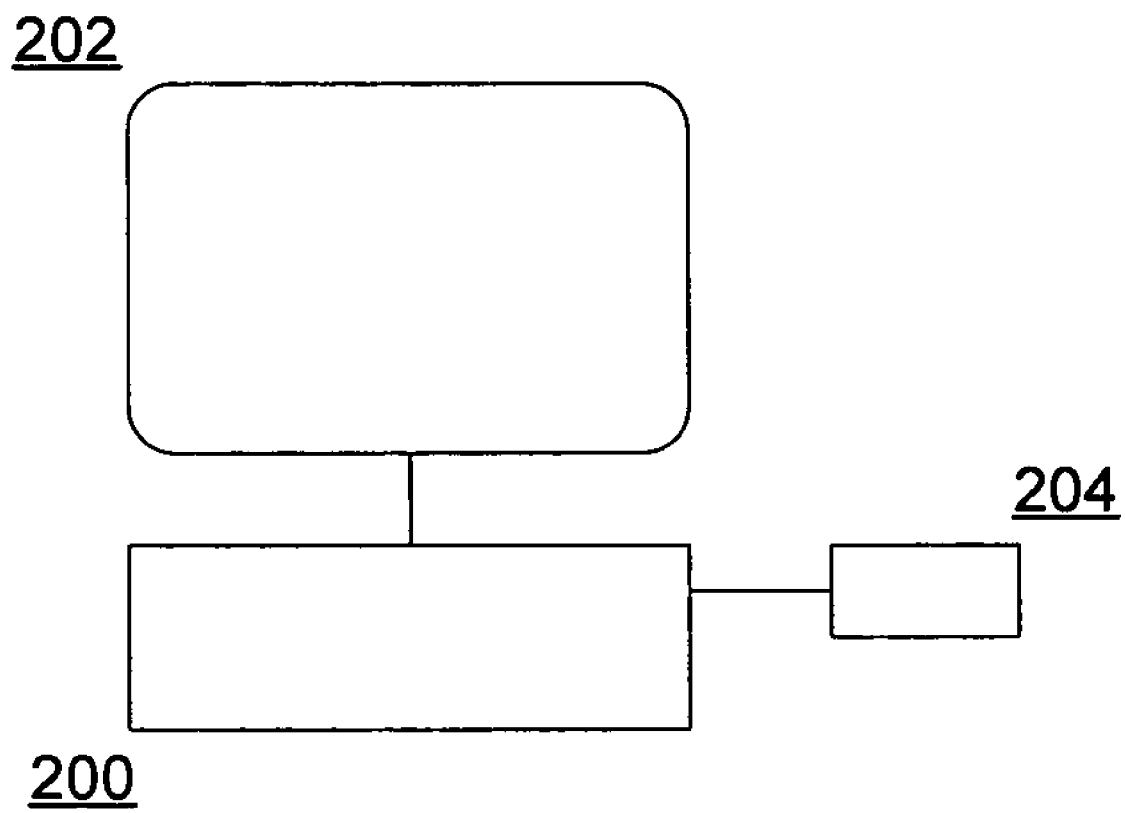
FIG. 13 shows a hardware apparatus.

FIG. 13 shows a hardware apparatus. The hardware apparatus can be configured to store and perform the information and methods discussed above. The hardware apparatus has a processing unit 200 with one or more CPUs, volatile storage such as RAM (not shown), non-volatile storage such as a disk drive or a CD-ROM or other storage medium, and other typical computer components. The hardware apparatus will also have a display 202 for displaying graphics generated according to the embodiments discussed above. The hardware apparatus will also have an input unit 204, such as a mouse, for a user to input control information for example to move a point or object.

The present invention has been described with respect to a system or method that diffuses or distributes curvature into a set of target vertices, by computing curvature or discrete mean curvature at boundary vertices of the set of target vertices. The boundary curvatures may be diffused or distributed into the set of target vertices by solving a system of Umbrella operator equations for local of respective vertices of the set of target vertices, with the computed curvature at the boundary vertices as a boundary condition for the system of equations. The vertices of the set of target vertices may be repositioned relative to the according to the solved curvatures of the respective vertices of the set of vertices. The computing, diffusing or distributing, and repositioning may be repeated, thereby changing the overall shape of the set of target vertices according to the curvature at the boundary vertices. The target vertices preferably form a mesh.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method for distributing curvature from the boundary vertices of a received mesh to its interior vertices, comprising:

receiving a mesh, where each boundary vertex B of the mesh has a prescribed normal $n_B$;

computing and saving for each interior vertex V a set of weights $w_i$ of an associated umbrella operator;

computing a curvature $k_B$ of each boundary vertex B using the formula $k_B = c_B n_B \cdot \text{Umbrella}(B)$, where $k_B$ is a scalar, Umbrella(B) is a positional umbrella operator at B, and $$c_B = \frac{\sum (\cot \alpha_i + \cot \beta_i)}{4 Area}$$

is computed from local angle and area information;

finding a target curvature $k_V$ for each interior vertex V by solving simultaneous equations Umbrella(k)=0 for all V;

repositioning each vertex V to a new position $b_V + c n_V$, where c is chosen such that a curvature of V at the new position is the target curvature $k_V$, and neighbors $V_i$ of V and the saved weights $w_i$ are used to find a base position $$b_v = \frac{\sum w_i V_i}{\sum w_i}$$

and a normal $$n_v = \frac{\sum V_i \times V_{i+1}}{\sum |V_i \times V_{i+1}|};$$

and displaying the mesh.

* * * * *

UNITED STATES PATENT AND TRADEMARK OFFICE
CERTIFICATE OF CORRECTION

PATENT NO. : 7,239,313 B2 Page 1 of 1
APPLICATION NO. : 10/835285
DATED : July 3, 2007
INVENTOR(S) : Peter Liepa It is certified that error appears in the above-identified patent and that said Letters Patent is hereby corrected as shown below:

Title Page, Column 2, (Other Publications), Line 3, change "Saarabrucken," to --Saarbrucken,--.

Title Page, Column 2, (Abstract), Line 10, before "their" delete "the".

Signed and Sealed this

Eleventh Day of December, 2007

JON W. DUDAS
*Director of the United States Patent and Trademark Office*